Oct. 30, 1934.    N. G. MADGE ET AL    1,978,803
METHOD AND APPARATUS FOR THE MANUFACTURE OF RUBBER THREAD
Filed Nov. 18, 1932

INVENTORS
NORMAN G. MADGE
ALEXIS W. KEEN
BY
ATTORNEY

Patented Oct. 30, 1934

1,978,803

UNITED STATES PATENT OFFICE 1,978,803

METHOD AND APPARATUS FOR THE MANUFACTURE OF RUBBER THREAD

Norman G. Madge, Providence, R. I., and Alexis W. Keen, Passaic, N. J., assignors to National India Rubber Company, Providence, R. I., a corporation of Rhode Island Application November 18, 1932, Serial No. 643,180

5 Claims. (Cl. 18—8)

This invention relates to the manufacture of rubber thread, and has for an object the continuous and rapid production of rubber thread in a simple and inexpensive manner from a suitable aqueous dispersion of rubber, such as rubber latex.

Other objects and advantages will appear from the following description, reference being made to the accompanying drawing illustrating a certain present preferred form of practicing the invention, in which—

Figure 1:
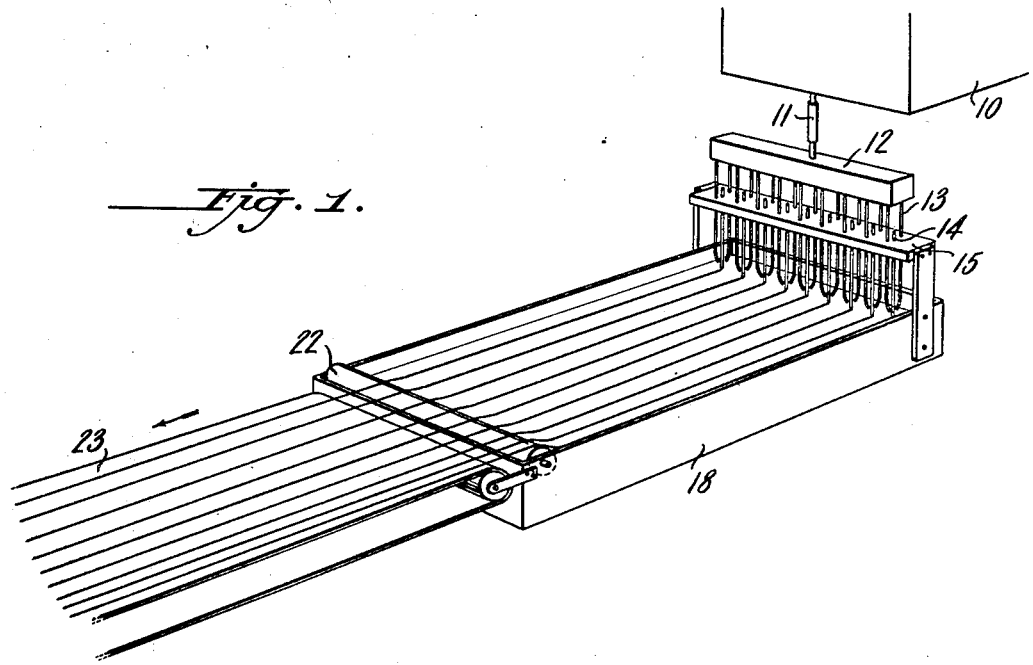
Figure 2:
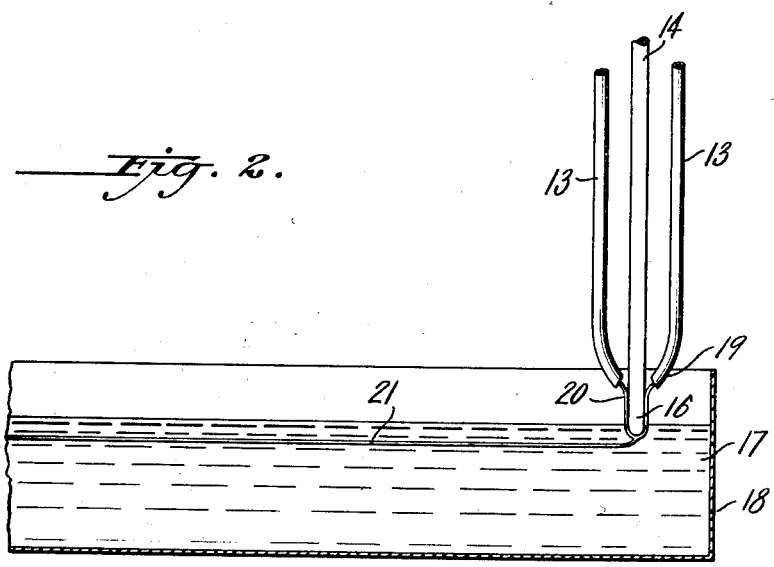

Figure 1 is a perspective view more or less diagrammatically illustrating an apparatus and method embodying and carrying out the invention; and Figure 2 is a detail side elevation of the thread forming part of the apparatus of Fig. 1.

Referring to the drawing, the numeral 10 designates a reservoir for an aqueous dispersion of rubber, such as natural latex containing vulcanizing ingredients, so that on subsequent drying and heating of rubber thread formed from it, the thread may become vulcanized. The latex is led from the reservoir through a connecting hose 11 to a header 12 where it is fed to a series of vertical latex feed pipes 13 attached to the header. The exit ends 19 of the feed pipes 13 are curved toward and are situated adjacent a series of supports or vertical rods 14 mounted with their upper ends in a bracket 15 and having their lower ends 16 depending below the surface of a liquid coagulant 17 in one end of a tank 18, to which tank the bracket 15 is attached.

The latex flows through the tubes 13 and issues from the exit ends 19 of the feed pipes 13 onto the surfaces of the rods 14 in laterally unconfined streams 20 which flow by gravity down the surfaces of the rods to the ends 16 depending below the surface of the coagulant 17. The latex is coagulated at the ends 16 and continuous lengths 21 of coagula are drawn away from the ends 16 through the coagulant 17, over a roller 22 mounted at the opposite end of the tank 18 onto a travelling belt 23, and then to the desired drying and vulcanizing chambers.

In operation, latex is fed from the reservoir 10 to the surfaces of rods 14 through pipes 13, the exit ends 19 of which are adjacent the surfaces of the rods 14. Two feed pipes 13 delivering latex to each rod 14 have been found very satisfactory, although one or more than two may be used, if desired. The flow of latex through the pipes 13 may be regulated to give the optimum delivery to the rod surface for the desired size of thread by regulating the height of the reservoir, the column of latex feed, and the internal size of the hose connections 11 by pinch-cocks or other means. The latex flows down the surfaces of rods 14 in laterally unconfined streams into the coagulant 17 below the surface of which the ends 16 of the rods depend, and the coagula formed are withdrawn from the depending ends 16 in the form of continuous threads through and out of the coagulant at the desired speed over roller 22 by travelling belt 23, and carried from the tank to subsequent drying and vulcanizing operations.

It is, of course, obvious that the viscosity of the latex, the rate of flow of the latex through the feed pipes, the position of the feed pipes, the depth to which the rods depend below the surface of the coagulant, the composition of the latex with reference to the various compounding ingredients, the rate of withdrawal of the coagulum, and the length of travel through the bath may be varied as desired. The latex may be vulcanized, or it may be unvulcanized, with or without vulcanizing ingredients added thereto. If a vulcanized thread is desired, it may be obtained by compounding the latex with suitable ingredients as described above and drying and vulcanizing the filamentary coagulum; or it may be formed from a vulcanized latex, in which case drying alone of the filamentary coagulum will produce a vulcanized thread; or a thread formed from unvulcanized latex without vulcanizing ingredients may be subjected to the action of vulcanizing liquids or vapors, or to solutions containing vulcanizing ingredients. The latex may be made heat sensitive by methods well known in the art and the latex streamed into a hot coagulant in the manner above described.

The term "latex" in the description and claims is used to designate broadly coagulable dispersions of elastic materials, including artificial dispersions of rubber or rubberlike materials as well as natural latex, which may be preserved or compounded or otherwise treated as desired and which may be in a normal, diluted, concentrated or purified condition produced by methods well known in the art.

The tank for the coagulant liquid may take the form of a series of troughs and the coagulant in the tank or troughs may be circulated in the direction of removal of the lengths of coagula, thus utilizing such movement of the coagulant to aid in withdrawing the formed threads through and out of the coagulant and onto the belt for subsequent drying and other operations.

Various other modifications will be apparent to persons skilled in the art and it is understood that we do not intend to limit ourselves to the specific improvements as described above except as indicated in the appended claims.

Having thus described our invention what we claim and desire to protect by Letters Patent is:

1. A process for making rubber thread comprising steps of introducing a laterally unconfined stream of latex by gravity into a body of coagulant and forming a continuous length of coagulum therefrom, and removing the length of coagulum from the coagulant.

2. A process for making rubber thread comprising the steps of forming a continuous length of coagulum by streaming latex down the surface of a support into a body of coagulant below the surface of which one end of the support depends, and removing the length of coagulum from the coagulant.

3. A process for making rubber thread comprising the steps of forming a continuous length of coagulum by streaming latex down the surface of a rod into a body of coagulant below the surface of which one end of the rod depends, and removing the length of coagulum from the coagulant.

4. In an apparatus for making rubber thread, a tank for containing a liquid coagulant for latex, a rod maintained in stationary relationship to said tank so that one end of the rod depends below the surface of coagulant in the tank, and means for streaming latex down the surface of the rod.

5. In an apparatus for making rubber thread, a tank for containing a liquid coagulant for latex, a rod maintained in stationary relationship to said tank, so that one end of the rod depends below the surface of coagulant in the tank, means for streaming latex down the surface of the rod into coagulant in the tank, and means for removing a continuous length of coagulum from said depending end of said rod.

NORMAN G. MADGE.
ALEXIS W. KEEN.